United States Patent [19]

Desrochers

[11] Patent Number: 4,530,069
[45] Date of Patent: Jul. 16, 1985

[54] EXPANDABLE DATA COMMUNICATION SYSTEM UTILIZING HAND-HELD TERMINAL

[75] Inventor: Franklin J. Desrochers, Davison, Mich.

[73] Assignee: Universal Data, Inc., Clarkston, Mich.

[21] Appl. No.: 409,778

[22] Filed: Aug. 20, 1982

[51] Int. Cl.³ .............................................. G06F 3/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,576,433 | 4/1971 | Lee et al. | 235/153 |
| 3,771,132 | 11/1973 | Biewer | 340/172.5 |
| 3,942,157 | 3/1976 | Azure | 340/172.5 |
| 3,976,840 | 8/1976 | Cleveland et al. | 179/2 |
| 4,016,542 | 4/1977 | Azure | 340/172.5 |
| 4,068,095 | 1/1978 | Ghormley et al. | 179/2 |
| 4,115,870 | 9/1978 | Lowell | 364/900 |
| 4,143,417 | 3/1979 | Wald et al. | 364/900 |
| 4,192,006 | 3/1980 | Havsdoeff | 364/900 |
| 4,218,760 | 8/1980 | Levy | 364/900 |
| 4,228,495 | 10/1980 | Bernhard et al. | 364/200 |
| 4,268,721 | 5/1981 | Nielson et al. | 179/2 |
| 4,277,837 | 7/1981 | Stuckert | 364/900 |
| 4,355,372 | 10/1982 | Johnson et al. | 364/900 |

Primary Examiner—Jerry Smith
Assistant Examiner—Gary V. Harkcom
Attorney, Agent, or Firm—Harness, Dickey & Pierce

[57] ABSTRACT

A portable, hand-held microprocessor-based terminal forms the heart of an expandable data communication system having an architecture configured so that a variety of peripheral devices can communicate directly with the microprocessor in the portable terminal. Access to the microprocessor and associated on-board memory is made by way of an external connector coupled directly to the internal bus structure of the terminal. Data may be collected, for example, by way of inputs to a keyboard on the terminal or an optional sensor module detachably connected to the bus connector on the terminal housing. An expansion unit takes the form of a base adapted to support the portable terminal and to make connections between the terminal bus connector and peripheral devices plugged into the base so that they can communicate with the terminal microprocessor via the internal bus.

9 Claims, 5 Drawing Figures

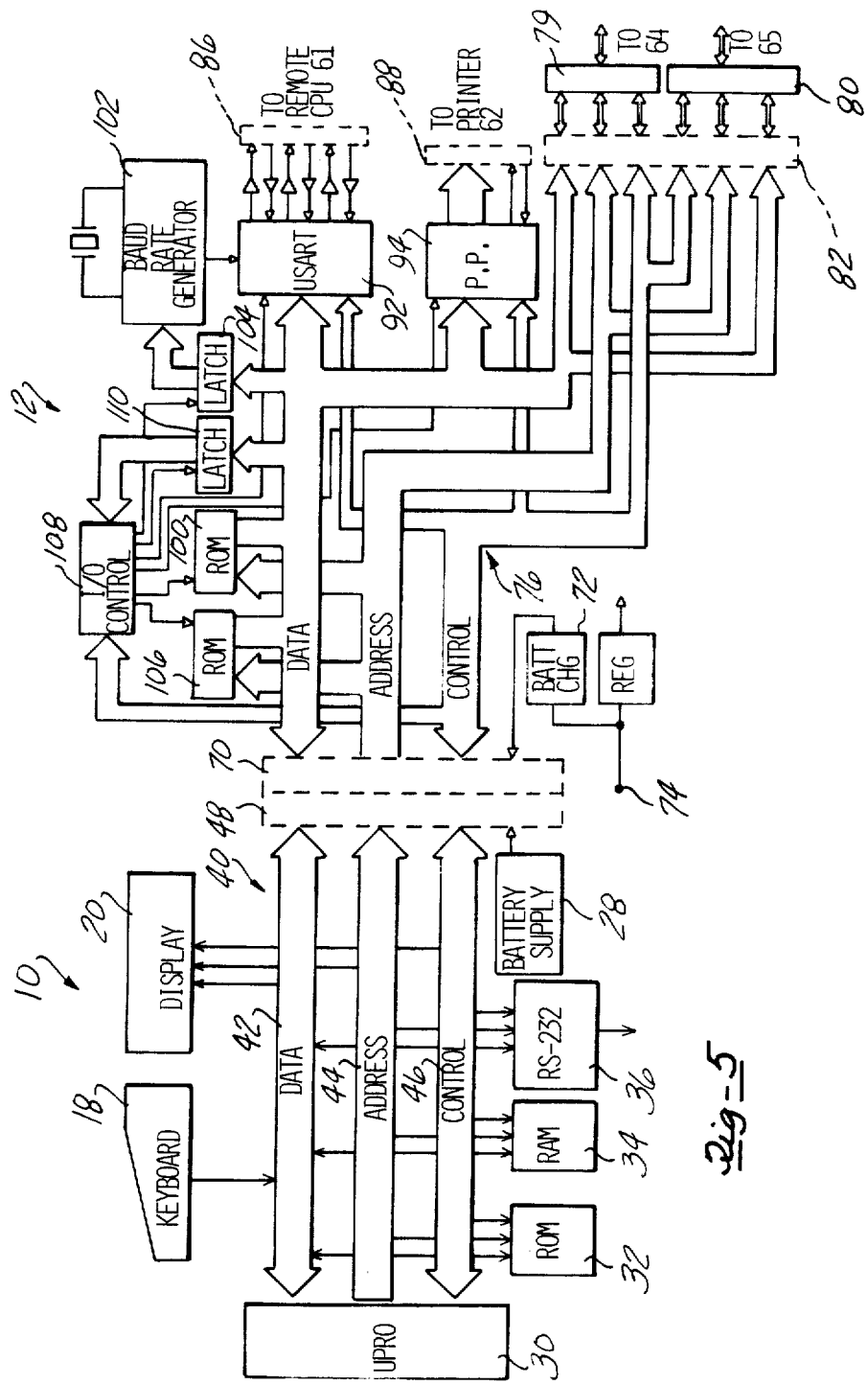

EXPANDABLE DATA COMMUNICATION SYSTEM UTILIZING HAND-HELD TERMINAL

TECHNICAL FIELD

This invention relates to data communication systems, and more particularly, to portable terminals and system architectures therefore.

BACKGROUND ART

Portable, hand-held data entry devices or "electronic notebooks", as they are sometimes called, have enjoyed increasing popularity in a wide variety of data gathering applications. Where, in the past, data was manually gathered and converted into computer compatible form for transmission to a remote main CPU, these portable data entry devices automatically convert the data into a suitable form for transmission to the CPU. The data entry devices may include onboard modems or separate interface formatter units for converting the digital data stored in memory to a form compatible for transmission over the telephone lines to the remote CPU. U.S. Pat. Nos. 3,976,840 to Cleveland et al; 4,068,095 to Ghormley et al; and 4,268,721 to Nielson et al are examples of the former and U.S. Pat. Nos. 3,942,157 and 4,016,542 both to Azure are representative examples of the latter.

Some of the applications for these devices include reordering of goods in grocery stores; monitoring station readings for pollution controls; meter reading in gas and utilities; generating route sales orders; field service applications; and data collection in scientific research.

While these prior art devices have certainly decreased the task of data gathering, they are somewhat lacking in versatility. For the most part the prior art data entry devices are designed exclusively for communication with a remote CPU via a modem over the telephone lines. They are not capable of communicating directly with a plurality of external hardware peripheral devices without requiring substantial modification of the data entry device design. Unfortunately, this lack of versatility wastes the potential resources available from the on-board microprocessor in those units employing one. The units such as those shown in the '721 patent do, of course, utilize internal self-contained miniaturized electronic equipment such as a liquid crystal displays, keyboards, and printers which may loosely be termed peripheral devices. However, these are to be distinguished from which shall be defined as "external peripheral devices" such as high speed printers, floppy disk memories, and the like which can be detachably removed to expand or contract the overall system configuration in a truly modular approach.

Several desk top computer terminals now available on the market do have this advantageous expansion capability. Unfortunately, while they are loosely referred to as portable terminals they are in reality bulky and cumbersome devices that do not lend themselves to use in those applications noted above where hand-held devices are commonly used. The desk top terminals generally employ two separate bus structures; an internal bus providing communication between the terminal microprocessor and on-board memory; and a system bus structure to which the external peripheral devices are connected. This dual bus structure requires the use of bus interfaces to provide the necessary timing signals and data formatting to enable communication between the external peripheral device and the terminal microprocessor. Generally there are two such bus interfaces; one between the hardware of the peripheral device and the system bus, and another interface between the system bus and the internal bus connected to the microprocessor. This approach requires the use of costly and space consuming hardware logic to provide the relatively sophisticated control signals to effectuate communication between the external peripheral device and the terminal microprocessor.

SUMMARY OF THE INVENTION

According to the present invention a hand-held microprocessor-based, battery operated terminal is provided with an external connector coupled to the internal bus structure of the terminal communicating directly with the microprocessor and an associated random access memory (RAM). The hand-held terminal is entirely self-sufficient and may be used for a variety of data gathering functions. Preferably, an optional sensor module is detachably coupled to the connector and may be used to collect analog data and convert it into digital form for storage in the terminal RAM. An expansion base unit is adapted to support the hand-held terminal and provide parallel electrical connections to a plurality of external peripheral devices. The external peripheral devices may be selectively plugged in to the expansion base unit. The external peripheral devices thus may gain direct access to the internal bus structure of the terminal and utilize the processing capabilities of the microprocessor therein. Direct access to the internal data bus eliminates the need for a separate system bus structure and associated system bus interface circuitry.

In the preferred embodiment, the terminal includes a housing with a keyboard and a display on its upper surface. The internal bus connector is located on the bottom of the housing and adapted to mate with an associated connector in the expansion base unit. The base unit includes a receptacle with a slanted major surface for holding the terminal in an inclined position so that the keyboard and the display are readily usable by the operator. The internal confines of the base housing is of sufficient size to accomodate a plurality of circuit board modules including such things as expansion memory, a universal synchronous asynchronous receiver transmitter (USART) interface device, a parallel port interface device, video-audio interfaces, and the like.

Such a system architecture configuration provides a truly versatile approach efficiently using the processing capabilities of the microprocessor and associated components in the terminal. At the same time, the terminal may be readily used for a wide variety of data gathering applications when detached from the expansion base unit.

BRIEF DESCRIPTION OF THE DRAWINGS

Still other advantages of the present invention will become apparent to one skilled in the art after reading the foregoing specification and by reference to the drawings in which:

FIG. 5 is a schematic block diagram of electrical circuitry utilized in the preferred embodiment of the invention.

DESCRIPTION OF THE PREFERRED EMBODIMENT

Figure 1:
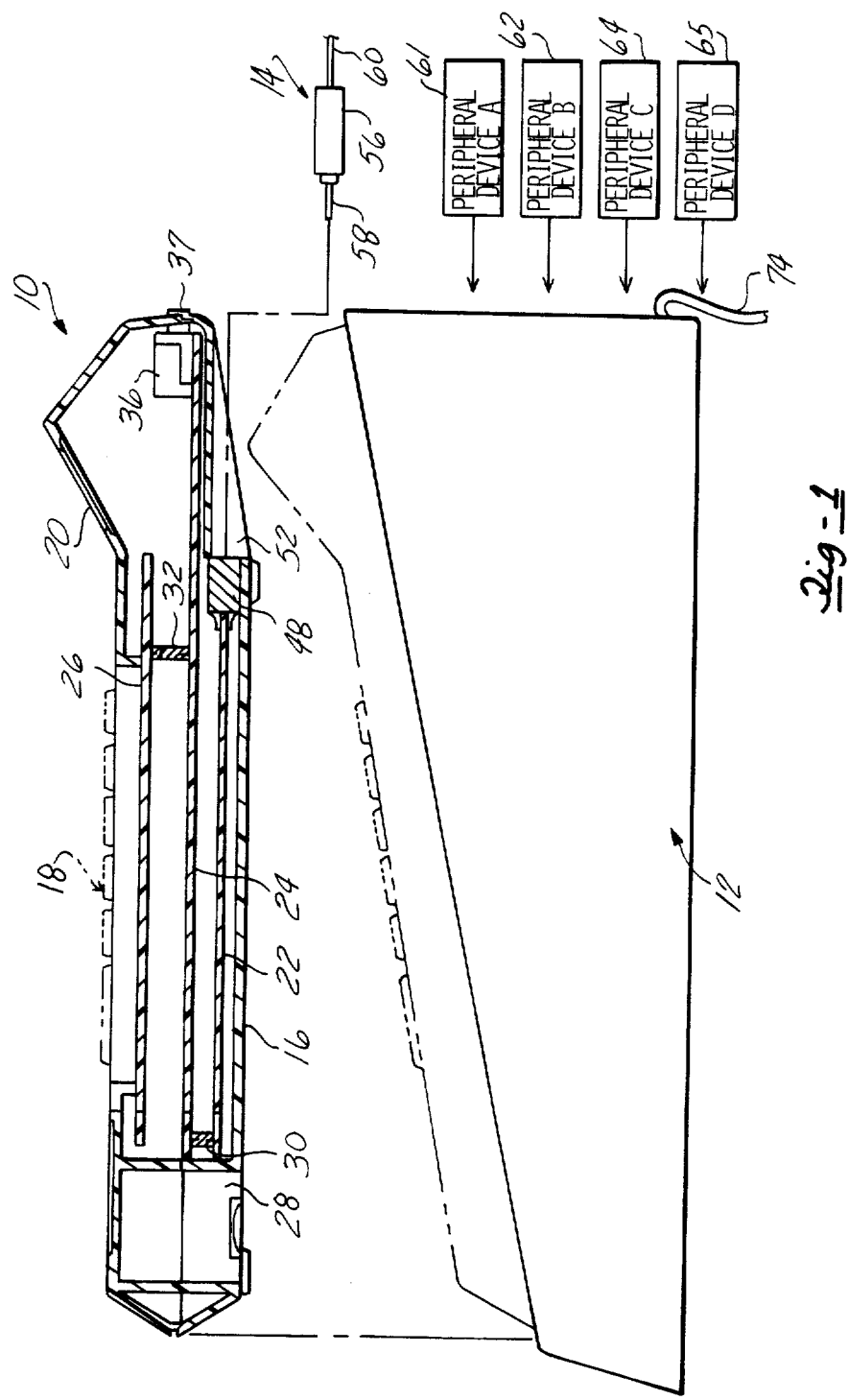
FIG. 1 is an exploded view with parts in cross section schematically illustrating the system architecture configuration of the preferred embodiment.

FIG. 1 illustrates the three main components of the system architecture configuration of the present invention; terminal 10, expansion base unit 12 and an optional sensor module 14.

Terminal 10 includes a generally rectangular housing 16 having an alphanumeric keyboard 18 and a two row liquid crystal display 20 on its upper surface. Housing 16 is of a size such that it can be conveniently held in the hand of the user. The interior of housing 16 is generally of a hollow construction and adapted to receive a plurality of circuit boards 22-26 containing electronic components mounted thereon in the usual manner. These components are powered by a suitable battery supply 28 located in a forward compartment. The individual circuit boards may be connected together in a variety of suitable manners such as by way of headers 30, 32 and the components on the circuit board conventionally connected to keyboard 18 and display 20 for receiving data/control signals and driving segments thereof, respectively.

FIG. 5 in the left hand seqment illustrates the major electronic components of terminal 10. Lying at the heart of the terminal 10 is microprocessor 30. In the preferred embodiment microprocessor 30 is an 8-bit CMOS device such as an RCA 1802. Terminal 10 is truly a self-contained microprocessor system and, thus, incorporates read only memory (ROM) 32 and random access memory (RAM) 34. ROM 32 is adapted to provide instruction codes to microprocessor 30 in a manner well known in the art and RAM 34 provides temporary storage locations for gathered data and the like. Rounding out terminal 10, an RS-232 INTERFACE enables transmission of the gathered data via connector 37 to a modem or suitable external device for sending out the data over the telephone lines to a remote main CPU. Alternatively, a digital bar code wand for reading bar codes can be coupled to connector 37.

The terminal components thus far described communicates with microprocessor 30 over an internal bus structure generally designated by the reference numeral 40. Bus structure 40 is further broken down in FIG. 5 into a data bus 42, address bus 44, and control bus 46. Internal bus structure 40 contains all of the necessary signal lines to permit direct communication with microprocessor 30. Internal bus structure 40 is to be distinguished from a system bus to which similar internal bus structures are connected in the prior art approach, the system bus using different timing to transfer data thereon and generally not having a one-to-one relationship with the signal lines of the internal bus structure. Internal bus structure 40 is also to be distinguished from output lines from input/output (I/O) devices. I/O devices are commonly used to accept asynchronously transmitted data from an external peripheral device and provide it in an appropriately timed relationship to the microprocessor over an internal bus structure. In contrast, all of the devices which "hang" on the internal bus structure 40 can communicate directly with microprocessor 30 without requiring decoders and timing logic to effectuate proper communication. In the preferred embodiment, data bus 42 includes eight lines, address bus 44 eleven lines and control lines 46 nineteen lines. The functions of data bus 42 and address bus 44 are self explanatory. Control bus 46 incorporates lines for carrying command signals to control system operation but also includes lines for carrying timing signals and power to the system devices which are clocked in a synchronous manner.

Figure 2:
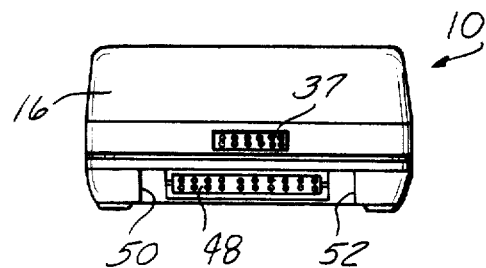
FIG. 2 is a rear view of the terminal shown in FIG. 1.

According to the present invention, the internal bus structure 40 is directly coupled to an external connector 48. As can be seen most clearly in FIGS. 1 and 2, connector 48 is a 44 pin (dual 22) female connector located on bottom portions of housing 16. Connector 48 is an off-the-shelf item commonly used in the electronics trade. The internal side of connector 48 is connected to conductor lines of the internal bus structure 40 on circuit board 22. Conventional transceivers, drivers and receivers (not shown) may be employed on board 22 as isolation buffers. The external side of connector 48 faces the rear portion of terminal 10 within a pocket defined by shoulders 50, 52 in the inclined lower nose portion of housing 16. This arrangement protects connector 48 from damage while also providing an aesthetically pleasing appearance for terminal 10.

By itself, terminal 10 can be used as a self contained microcomputer system for a variety of purposes. For example, it may be used as a data gathering device or electronic notebook in which information entered via keyboard 18 is stored at RAM 34. The use of optional sensor module 14 enables terminal 10 to gather and store other types of non-alphanumeric data. For example, sensor module 14 may be used to gather scientific research data. In the preferred embodiment, module 14 includes a housing 56 and a male connector 58 on one end for detachably connecting module 14 to connector 48 of terminal 10. A probe 60 is adapted to sense a wide variety of external environmental conditions such as temperature, humidity, chemical characteristics of liquids and the like by use of suitable sensors. The probe 60 is sufficient length so it extends beyond the housing of terminal 10 so that data sensing can be conveniently made. The output of the sensors on probe 60 are fed to analog to digital converters (not shown) within housing 58. Alternatively, the analog data may be coupled via a cable to the D/A converters. The gathered data may then be analyzed by microcomputer 30 and the results stored at suitable memory locations within RAM 34. A wide variety of various sensor modules will become apparent to one skilled in the art. Regardless of its detailed form, sensor module 14 has direct access to the terminal microprocessor 30 and associated memory via the internal bus connector 48.

The expansion base unit 12 enables terminal 10 to become part of a larger data communication system employing one or more external peripheral devices 61, 62, 64, 65 as shown in FIG. 1. In its broadest aspects, unit 12 has two primary functions: first, to support terminal 10 and, secondly, to provide parallel electrical connections between terminal bus connector 48 and a plurality of external peripheral devices 61, 62, 64, 65. Base unit 12 need not necessarily contain any sophisticated electronics. These costly electronic components can be left for physical implementation in the terminal 10 or peripheral devices 61, 62, 64, 65 where they can be more efficiently utilized. In other words, the system architecture configuration of the present invention utilizes base unit 12 to interconnect, in an integral system, those electronic components which may have utility in and of themselves. For example, the microprocessor 30 of terminal 10 may control calculations and loading of RAM 34 when it is used as a portable data gathering device apart from expansion base 12. Similarly, if peripheral device 64 is a video display, it may be unplugged from unit 12 and used in another application, perhaps as a normal television receiver. However, when the terminal 10 and peripheral devices are connected together by expansion base 12 they all cooperate to form a versatile data communication system. Since the peripheral devices have direct access to the terminal microprocessor 30 via internal bus connector 48, a wide variety of system configurations and uses may be achieved at comparatively little expense.

Turning to FIGS. 1-4, in the preferred embodiment base unit 12 includes a concave receptacle in its upper surface for receiving approximately the lower half of terminal 10. The receptacle advantageously employs a slanted major surface 66 at an angle of approximately 10 to 20 degrees with respect to the horizon to support terminal 10 at an inclined position. The inclined supporting position provided by unit 12 enables the user to physically access keyboard 18 more easily than if it were lying completely horizontally. This also enables the user to readily read display 20 while minimizing glare.

Figure 3:
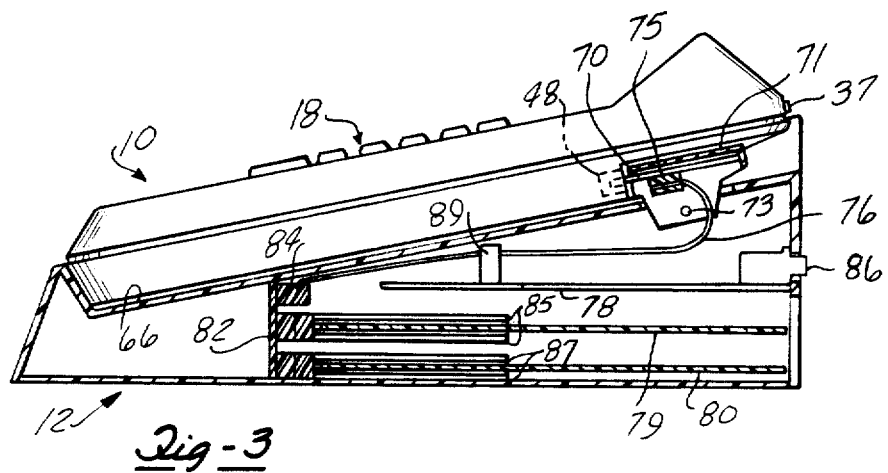
FIG. 3 is a side view with parts in cross section illustrating the terminal supported by the expansion base unit.
Figure 4:
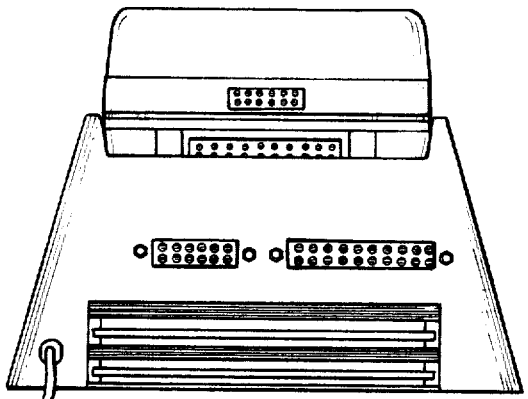
FIG. 4 is a rear view of FIG. 3.

A male connector 70 on the upper portions of receptacle surface 66 is adapted to mate with terminal bus connector 48 as can be seen most clearly in FIG. 3. In the preferred embodiment connector 70 is a conventional male edge connector having contact pads on both sides thereof for making electrical connections with the female pins of connector 48. Connector 70 is secured to a casing 71 which pivots about pin 73, the pivoting action of casing 71 aiding in alignment of connector 70 with terminal connector 48. A variety of other connector designs may be used as long as the signal lines of the internal bus structure 40 are brought out externally of terminal 10. Of course, additional lines may also be included. For example, in this embodiment the base unit 12 includes a battery charging circuit 72 (FIG. 5) supplied by AC power over plug 74. The charging circuit 72 can thus be used to recharge battery supply 28 when terminal 10 is connected to base 12.

In FIG. 3, the conductor lines from connector 70 are coupled by way of a header 75 and ribbon cable 76 to the generally hollow interior of base unit 12. In the particular embodiment shown in FIG. 3, the interior of base unit 12 is of sufficient size to hold three circuit boards 78, 79 and 80. Male conductor pads on the right edge of circuit boards 79, 80 are connected into slots in a universal back plane connector device 82 and supported there by card guides 85, 87. The middle of cable 76 includes a header 89 connected to circuit board 78. The opposite end of cable 76 includes a female connector 84 coupled to back plane device 82. In such manner each circuit board 78, 79 and 80 is coupled in parallel to the internal bus structure 40 of terminal 10 via cables 76, connector 70 and connector 48. The external end of circuit board 78 is coupled to connectors 86 and 88 on the rear exterior of base unit 12. The external ends of circuit circuit boards 79, 80 may also include suitable connectors (not shown) depending on the type of circuit board modules employed. The external peripheral devices or any combination thereof may be plugged into these connectors. The configuration of the connectors will depend upon the plug construction of its respective peripheral device. In any event, the peripheral device may obtain direct access to the internal bus structure 40 and thus the on-board components, particularly microprocessor 30, of terminal 10.

While connector 70 may be directly coupled to the external connectors on base 12, the disclosed embodiment employs circuit board modules 78, 79 and 80 in an advantageous manner to facilitate communication between the peripheral devices and the terminal. Turning to FIG. 5, circuit board 78 includes a universal synchronous asynchronous receiver transmitter (USART) device 92 and a parallel port device 94. USART 92 provides synchronous or asynchronous communication between the terminal 10 and a remote main CPU 61. In the preferred embodiment, USART is an 8251 programmable communication circuit device which can be software programmed for asynchronous communications up to 19.2K baud, with 5-8 bits and error detection. It can also be programmed for synchronous communication up to 64K baud, with 5-8 bits per word and one or two sync characters such as required by the International Business Machine (IBM) "bi-sync" communication protocol. An erasable, programmable read only memory (EPROM) 100 is preferably used to define customizing communication protocols adapted to customers' specifications. A programmable crystal controlled oscillator 102 provides all baud rates under software control, baud rates being loaded into latch 104.

In this embodiment, plug 86 takes the form of a standard RS 232C 25 pin female subminiature "D" connector which provides all the necessary signals to interface with modems or computers.

The parallel port device 94 on circuit board 78 provides 8-bit data and strobe and senses the device ready with 5 volt TTL levels. An EPROM 106 provides up to 4K of software providing custom text output to match customer requirements. Connector 88 takes the form of a 15 pin female subminiature "D" connector to provide all the necessary connections to a printer such as a Centronics compatible parallel input printing device.

A suitable I/O control device 108 operates to provide control signals to devices 92 and 94 to activate same in response to port select signals supplied from microprocessor 30 to latch 110 in conjunction with appropriate I/O commands over control bus 46.

Circuit boards 79 and 80, on the other hand, are representative of any of the RCA COSMAC microboard modules of the CDP18S600 series. These circuit boards are generally designed to expand the capabilities of a microcomputer system and includes such things as memory expansion modules for increasing the memory capacity of the overall system, video display interfaces for cathod ray tube-type displays, A/D converters and the like. When circuit board 79 or 80 takes the form of an interface it is merely for convenience to allow communication capabilities with external peripheral device hardware that does not otherwise have its own built-in interface circuitry. Alternatively, a floppy disk controller may be employed on circuit board 79 or 80 and various types of automatic answering modem circuits can be used.

Those skilled in the art should now come to appreciate the advantages of the present invention. The system architecture configuration enables the user to employ a hand-held terminal that he can carry with him and collect data wherever he goes. Through the use of expansion base unit 12, he cannot only transmit and receive data from a variety of peripheral devices but the on-board memory, keyboard and display of the terminal can function as part of an integrated data communication system having a great versatility. By having direct access to the internal bus structure 40 substantial savings in data processing time and hardware costs are expected to be experienced. Still other objects and advantages of the present invention will become apparent to one skilled in the art upon a study of the specification, drawings and claims.

I claim:

1. A data communication system comprising:
   a hand-held terminal having electrical circuitry therein including a keyboard, a display, a random access memory (RAM) and a microprocessor communicating over an internal bus structure having data, address and control lines; said electrical circuitry being contained within a housing including a first connector coupled directly to the internal bus structure of the terminal and providing external connections thereto, said first connector including a plurality of individual conductive elements therein, each coupled to one of said data, address and control lines of the internal bus structure to thereby provide access thereto externally of the terminal;
   an expansion base unit for supporting the terminal and having a second connector adapted to mate with the first connector, said base unit being of sufficient size to hold a first circuit board therein, said circuit board having a first series of contact members on one edge thereof corresponding to the data, address and control lines of the internal bus structure in said terminal, a ribbon cable operative to connect said second connector to the series of contact members on the edge of the circuit board, and a third connector coupled to the other end of the circuit board and being externally mounted on said base unit for receipt of a connector coupled to the physical hardware of a peripheral device, thereby permitting communication between the peripheral device and the microprocessor in the terminal over the internal bus structure via the first, second and third connectors; and
   removable sensor module means for gathering data, said sensor module being adapted to be plugged into said first connector while gathering data and being removable therefrom prior to placing the terminal on the base unit.

2. The system of claim 1 wherein the first connector is located on the bottom of the terminal housing, said base unit including a receptacle conforming generally to the configuration of the bottom of the terminal housing and having a surface slanted at an angle with respect to the horizontal axis of the base to provide an inclined support for conveniently accessing the keyboard and visualizing the display on the terminal supported therein.

3. The system of claim 1 wherein said base unit is of sufficient size to contain a plurality of circuit boards stacked on top of each other in said base, each circuit board communicating directly and in parallel at their one ends with the internal bus structure of the terminal and with different peripheral devices at their other ends.

4. The system of claim 3 wherein one circuit board includes a universal synchronous asynchronous receiver transmitter device and a parallel port device, and means on the circuit board connected directly to the terminal internal bus structure for selectively controlling said devices.

5. A data communication system comprising:
   a hand-held terminal having a housing with a keyboard and a display on an upper surface thereof, a random access memory and a microprocessor contained within the internal comfines of said housing and communicating over an internal bus structure having data, address, and control lines;
   a first external connector on bottom portions of the housing connected to the internal bus structure of the terminal and facing towards a rear portion of the housing in a pocket defined by opposing shoulders in an inclined nose portion of the housing, said first connector including a plurality of individual conductive elements therein, each coupled to one of said data, address and control lines of the internal bus structure to thereby provide access thereto externally of the terminal;
   an expansion base unit having a receptacle conforming generally to the bottom portion of said terminal, said receptacle having a flat major surface inclined at approximately 10 to 20 degrees with respect to the major horizontal axis thereof to thereby support said terminal at an angle in which the user may obtain ready access to the keyboard and easily visualize said display on the terminal, said base unit having a second connector for mating with the first connector on the terminal, at least one circuit board extending lengthwise within the internal confines of said base unit, and means connecting said second connector to one part of said circuit board, and a third connector coupled to said circuit board and mounted on a portion of the base unit adapted for connection to a peripheral device; and
   removable sensor module means for gathering data, said sensor module being adapted to be plugged into said first connector while gathering data and being removable therefrom prior to placing the terminal on the base unit.

6. The system of claim 5 wherein said terminal includes a battery supply and said base unit includes a battery charging circuit, and wherein the mating of the first and second connectors operates to couple the charging circuit to the battery supply.

7. The system of claim 5 wherein the second connector is located on said receptacle surface in an area for receiving the inclined nose portion of the housing whereby the inclination of the nose provides adequate space for unobstructed mating between the first and second connectors.

8. A method of using a hand-held, battery operated, microprocessor-based terminal having an internal bus structure with a plurality of parallel data, address and control lines providing communication between the microprocessor and other devices in the terminal including a random access memory, said method comprising:
   (a) entering data into the terminal and storing said data in the memory by plugging a sensor module into a first connector on the terminal and using the sensor module to gather data; and, thereafter, removing said sensor module from the terminal;
   (b) sending said data over a communication link to a remote location;
   (c) providing said first connector on exterior portions of the terminal which is coupled directly to said internal bus structure, said first connector including a plurality of individual conductive elements therein, each coupled to one of said data, address and control lines of the internal bus structure to thereby provide access thereto externally of the terminal;

(d) placing said terminal on a supporting base unit having a second exterior connector thereon so that the first and second connectors mate together;

(e) providing a third connector on said base unit adapted to be coupled to an external peripheral device;

(f) electrically coupling said second and third connectors together through said base unit by way of a circuit board located within the base unit, said circuit board having a first series of contact members on one edge thereof corresponding to the data, address and control lines of the internal bus structure in said terminal, a ribbon cable coupling said second connector to the series of contact members on the edge of the circuit board, with the third connector being coupled to the other edge of the circuit board; and (g) connecting an external peripheral device to the third connector on said base unit whereby the peripheral device can communicate with the microprocessor in the terminal over said internal bus structure.

9. In an apparatus having a hand-held, battery operated, microprocessor-based terminal having an internal bus structure with a plurality of parallel data, address and control lines providing communication between the microprocessor and other devices in the terminal including a random access memory, with the terminal further including means for sending data stored in the memory over a communication link to a remote location, the improvement comprising:

a first connector on exterior portions of the hand-held terminal, said first connector being coupled directly to the internal bus structure of the terminal, said first connector including a plurality of individual conductive elements therein, each coupled to one of said data, address and control lines of the internal bus structure to thereby provide access thereto externally of the terminal;

removable sensor module means for gathering data, said module means being adapted to be connected to the first connector while gathering data and being removable therefrom; and a base unit for supporting said terminal, said base unit including a second connector on exterior portions thereof adapted to mate with the first connector on the terminal to thereby establish electrical connection with the internal bus structure in the terminal, and third connector on exterior portions of the base unit adapted to be connected to an external peripheral device, and means in the base unit for electrically coupling said second and third connectors together, said means including a first circuit board in the base unit having a first series of contact members on one edge thereof corresponding to the data, address and control lines of the internal bus structure in said terminal, said means further including a ribbon cable operative to couple said second connector to the series of contact members on the edge of the circuit board, with the third connector being coupled to the other edge of the circuit board, whereby a peripheral device connected to the third connector can communicate with the microprocessor in the terminal over said internal bus structure.

* * * * *